United States Patent [19]

Wupper

[11] Patent Number: 4,789,207
[45] Date of Patent: Dec. 6, 1988

[54] SLIP-CONTROLLED BRAKE SYSTEM FOR AUTOMOTIVE VEHICLES

[75] Inventor: Hans Wupper, Friedrichsdorf, Fed. Rep. of Germany

[73] Assignee: Alfred Teves GmbH, Frankfurt am Main, Fed. Rep. of Germany

[21] Appl. No.: 6,117

[22] Filed: Jan. 23, 1987

[30] Foreign Application Priority Data

Jan. 24, 1986 [DE] Fed. Rep. of Germany ....... 3602128

[51] Int. Cl.⁴ .......................... B60T 8/34; B60T 8/42
[52] U.S. Cl. .................................. 303/113; 303/115; 188/181 A
[58] Field of Search ............ 188/181 A, 344; 303/97, 303/100, 110, 113, 115, 116, 117

[56] References Cited

U.S. PATENT DOCUMENTS

| | | | |
|---|---|---|---|
| 3,908,805 | 9/1985 | Morse et al. | 188/181 A |
| 4,061,212 | 12/1977 | Blomberg | 188/181 A |
| 4,340,258 | 7/1982 | Farr | 303/116 |
| 4,377,221 | 3/1983 | Farr | 188/181 A |
| 4,602,705 | 7/1986 | Farr et al. | 188/181 A |
| 4,657,120 | 4/1987 | Farr | 188/181 A |
| 4,664,233 | 5/1987 | Tsuchida et al. | 188/181 A |

FOREIGN PATENT DOCUMENTS

| | | |
|---|---|---|
| 1028154 | 4/1958 | Fed. Rep. of Germany . |
| 1780605 | 3/1972 | Fed. Rep. of Germany . |
| 2847378 | 10/1978 | Fed. Rep. of Germany . |
| 1376041 | 5/1972 | United Kingdom . |
| 1416645 | 3/1973 | United Kingdom . |
| 2027832 | 8/1979 | United Kingdom . |
| 2029914 | 3/1980 | United Kingdom ............ 188/181 A |
| 2069642 | 8/1981 | United Kingdom ............ 188/181 R |
| 2156460 | 10/1985 | United Kingdom . |

OTHER PUBLICATIONS

Newton, Riddy: "Evaluation Criteria for Low Cost Anti-Lock Brake Systems for FWD Passenger Cars": SAE Technical Papers, serves 840464.

Primary Examiner—Duane A. Reger
Assistant Examiner—Timothy Newholm
Attorney, Agent, or Firm—James B. Raden

[57] ABSTRACT

A slip-controlled brake system for automotive vehicles equipped with a deceleration-sensitively actuated brake pressure modulator (1) comprising a shaft (7) rotating together with the wheel (6) and an inert mass (8) arranged on said shaft. If a critical wheel deceleration is exceeded, the inert mass (8) is axially displaced on the shaft (7) by an arrangement comprising a ball (10) and an inclined ramp (9), and the brake pressure in the wheel brake (5) of the associated wheel (6) is, by way of a lever (16) actuating a brake pressure control valve (17), thus controlled, that is maintained and/or reduced. The rotating inert mass (8) which, due to its inertia, at first continues to run at unreduced speed when the control action sets in, is slowed down to the rotational speed of the shaft (7) by a force depending on the instantaneous brake pressure in the wheel brake (5). During the control phase, the reference quantity ($v_{REF}$) relevant to the control action is, thereby, adapted to the instantaneous brake pressure and thus to the instantaneous friction coefficient existing between the road surface and the controlled wheel (6).

7 Claims, 2 Drawing Sheets

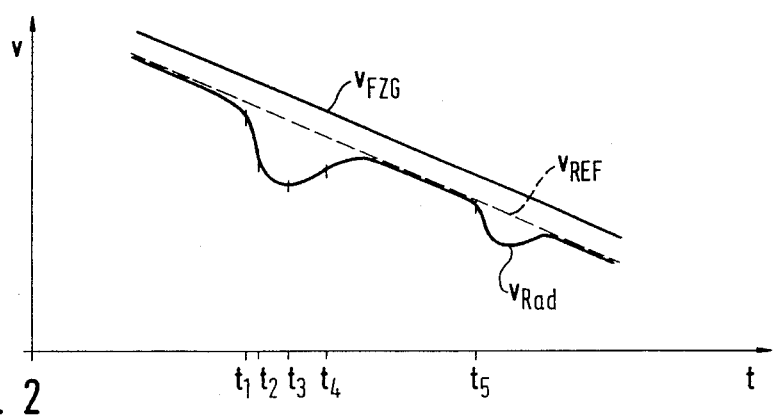
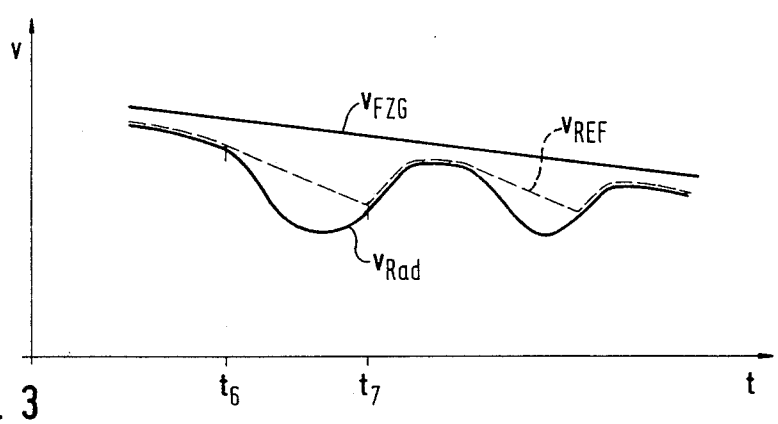
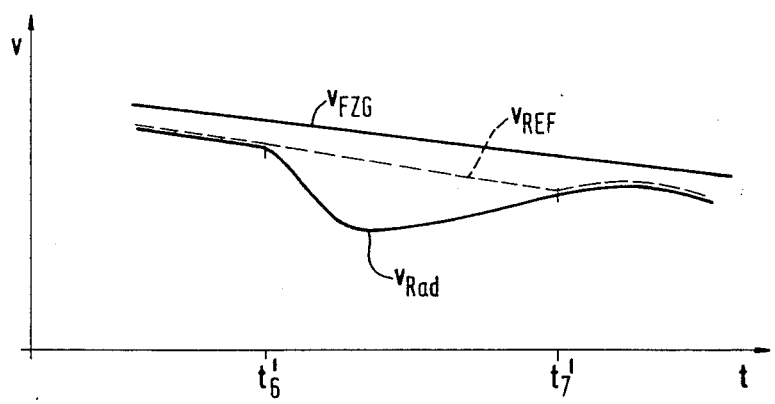

SLIP-CONTROLLED BRAKE SYSTEM FOR AUTOMOTIVE VEHICLES

BACKGROUND OF THE INVENTION

The present invention relates to a slip-controlled brake system for automotive vehicles with a deceleration-sensitively actuated brake pressure modulator comprising a shaft rotating at the angular velocity of the controlled vehicle wheel or at a multiple of that velocity and an inert mass arranged on the shaft and rotating together with the shaft. The inert mass is axially displaceable in opposition to a return force on the shaft when the controlled vehicle wheel is decelerated and a wheel deceleration threshold is exceeded and which thereby acts upon a control element controlling the brake pressure modulation. The system further includes a clutch and brake mechanism which permits a difference in speed between the shaft and the inert mass when the vehicle wheel is decelerated, and which causes the axial displacement as well as a deceleration of the inert mass during the control phase.

A brake system of this type is known (SAE Technical Paper Series, No. 840464, Newton, Riddy, Intern. Congress, from Feb. 27, until Mar. 2, 1984). The inert mass of the modulator, which inert mass is shaped in the form of a flywheel, is connected with the rotating shaft which is driven by the vehicle wheel through a ball and ramp arrangement. If a predetermined wheel deceleration threshold is exceeded, the axial movement of the flywheel on the shaft causes the opening of a valve through the lever of a control element by which means the brake pressure in the wheel brake is relieved and a re-acceleration of the wheel is brought about. In addition, the ball and ramp arrangement comprises a brake mechanism which, after the displacement of the flywheel and the opening of the pressure relief valve, has a braking effect on the flywheel which, through its inertia, rotates faster than the shaft during this phase, and which brake mechanism thus causes a deceleration of said flywheel. The force determining the deceleration is derived from a return spring abutting on a peripheral edge of the shaft. The deceleration force is, therefore, constant.

In controlled brake systems of this type, the speed reference quantity for the controlled wheel required for slip monitoring and slip control is obtained from the flywheel and the mechanism described above. In this case, the speed reduction of the inert mass follows from the illustrated brake system which effect is determined by the return spring and by friction elements within the clutch. The difficulties encountered with the formation of a speed reference quantity on the basis of one wheel only follow from that during the phase with an instable rotational behavior of the wheel, that is, as long as the vehicle wheel is in an excessive slip phase, the reference quantity cannot be derived from the wheel speed as such or from other wheels but must be reduced with a predetermined value which is independent of the actual rotational behavior of the wheel. In the mechanical system described, this is achieved through a deceleration of the flywheel by means of friction linings and the return spring. In electronic systems, however, information about the vehicle speed and deceleration required to form the reference quantity can be gathered during this phase by means of measurements on the other wheels which run in a stable manner.

Ideally, the speed reference quantity should decrease analogously to the vehicle deceleration during a phase of instability of a vehicle wheel. When each wheel is controlled individually and the reference quantity is generated individually, however, no information about the vehicle deceleration is available during the slip phase. For safety reasons, the decrease in reference quantity must, during this control phase, therefore be regulated such that even in the event of stops on road surfaces with high friction coefficients. That is, on dry non-skidding road surfaces, the speed reference quantity will not, upon completion of the critical wheel slip phase, assume a higher speed value than the wheel running in a stable manner since, otherwise, a critical wheel slip would be simulated and the brake pressure would be reduced during this stable phase. In situations with lower friction cooefficients, that is on slippery road surfaces, however, the course of the reference quantity applicable to road surfaces with high friction coefficients, to which the system is set, is not optimal. In the event of a slippery road surface on which the maximum possible vehicle deceleration is relatively low, the reference quantity wil be reduced too fast, which will result in an early termination of the pressure reduction and thus in an unfavorable control behavior.

It is, therefore, an object of the present invention to overcome these difficulties and to create a brake system of the type initially referred to, wherein the vehicle reference speed, in particular the rate of decrease of this reference quantity during a phase of instability, conforms to the instantaneous friction coefficient, that is, to the respective road surface.

SUMMARY OF THE INVENTION

This object is achieved in a straightforward manner by means of a brake system, the improvement of which wherein the deceleration of the inert mass rotating together with the vehicle wheel, is varied as a function of the instantaneous brake pressure in the wheel brake of the controlled wheel.

The present invention thus advantageously utilizes the knowledge that a specific pressure must be prevailing in the wheel brake when a specific vehicle deceleration is to be achieved, and that, therefore, a proportionality exists between the controlled brake pressure in the wheel brake, which, in turn, provides conclusions with regard to the instantaneous friction coefficient, and the vehicle deceleration during a controlled stop. In the system according to the invention, the information about the vehicle deceleration is derived from the controlled brake pressure and is evaluated as additional information about the instantaneous friction coefficient. According to the present invention, this is achieved by means of a variable deceleration of the rotating inert mass of the brake pressure modulator as a function of the instantaneous brake pressure which is, for example, most easily put into practice by modifying the preload of (at least) a return spring and/or by abutting the spring on a sleeve or on a pisto which is axially displaceable and which is directly or indirectly acted upon by the instantaneous wheel brake pressure. For example, by way of a separate adjusting piston or by way of a lever. At a low brake pressure, the deceleration of the inert mass during the control phase is thus determined, substantially, by the spring force, at an increasing wheel brake pressure, however, it is also determined by this pressure component.

According to an advantageous embodiment of the present invention, the deceleration of the rotating inert mass sets in after the mass has been displaced from its inoperative position. The force required to decelerate the rotating mass is, expediently, at least approximately proportional to the return force acting in opposite direction to the axial displacement, wherein return force is, preferably, composed of the spring force and of a force component derived from the instantaneous brake pressure.

Another embodiment of the present invention provides an arrangement between a disc mounted on the shaft and the inert mass, with the arrangement comprising, substantially, a ball and an annular inclined ramp and causing the axial displacement in the event of a difference in speed between the shaft and the inert mass.

In order to decelerate the inert mass it is further provided to insert friction linings between an intermediate disc rotating together with the shaft and being displaceable parallel to the axis and between the inert mass. Finally, a brake pressure control valve is, according to a further embodiment of the present invention actuatable by way of a lever of the control element, which lever is directly or indirectly actuated by means of the inert mass, in the event of an axial displacement of the inert mass, the wheel deceleration threshold also being adapted to vary as a function of the return force.

Due to this measure, the wheel deceleration threshold is also adapted to the respective road conditions. At a low friction coefficient and thus a low brake pressure, a wheel becoming instable is, therefore, recognized at an early stage, on the one hand. On a dry road surface, on the other hand, a high deceleration is ensured during the phase of stability without the control system responding.

BRIEF DESCRIPTION OF THE DRAWING

Other features, advantages and applications of the present invention will become apparent from the following description of an embodiment of the present invention taken in connection with the accompanying drawing wherein:

FIG. 1 shows a diagram illustrating the course of the vehicle speed, the wheel speed and the reference quantity versus time for a controlled braking operation on a dry road surface;

FIG. 2 shows the same quantities to be measured, illustrated as in FIG. 1, for a controlled braking operation on a slippery road surface using a conventional brake system;

FIG. 3 shows a controlled braking operation, illustrated as in FIG. 2, on the same road surface using a brake system according to the invention; and, FIG. 4 shows a schematic, simplified illustration of the most important components of a brake system according to the invention.

DETAILED DESCRIPTION

Figure 4:
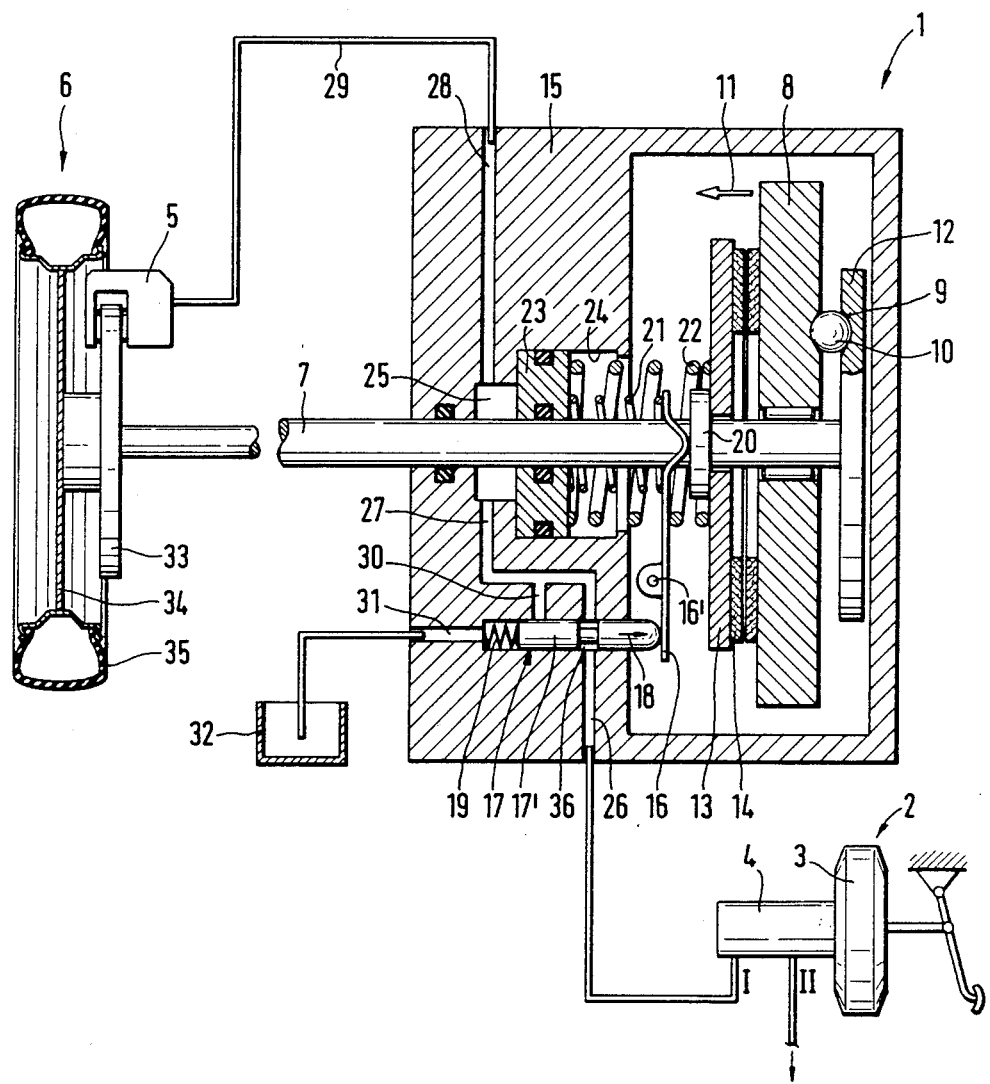

In FIGS. 1 to 3 of the drawing, the wheel speed $v_{Rad}$, the vehicle speed $v_{FZG}$ and the speed reference quantity $v_{REF}$ serving as reference quantity for the brake pressure modulation are illustrated. In all diagrams the scale used for time and speed are the same.

FIG. 1 refers to a controlled braking operation on a dry road surface permitting a relatively high wheel and vehicle deceleration, as illustrated by the precipitous characteristic curves. At time $t_1$, a wheel lock tendency occurs. The slip, i.e. the difference in speed between the vehicle speed $v_{FZG}$ and the wheel speed $v_{Rad}$, increases. At about time $t_2$, the wheel deceleration threshold is reached and, therefore, the slip control sets in. In the usual manner, the brake pressure is either reduced and/or held constant (depending on the design of the brake system and the control system) after instability has been recognized so that at time $t_3$, the wheel deceleration reaches the value zero and the wheel is then accelerated again. At about time $t_4$, brake pressure is again introduced so that an optimal wheel slip is again achieved after the reference speed $v_{REF}$ has been reached, and the braking of the vehicle is continued. During this phase, the characteristic curves of the wheel speed and of the reference speed coincide. At time $t_5$, a wheel lock tendency occurs again and, therefore, the control operations described above are repeated.

Since, in the situation according to FIG. 1, the vehicle deceleration reaches approximately the maximum value possible, and the reference quantity and/or the gradient of the reference speed $v_{REF}$ is set to this value during the phase of instability in which the reference value must be determined through extrapolation in systems of the type described herein, the gradient of the reference speed $v_{REF}$ shown in broken outline remains almost constant during the described phase of the controlled braking operation. The distance between the reference speed $v_{REF}$ and the vehicle speed thus corresponds to a specific wheel slip which should approximate the optimal value.

During the braking operations according to FIGS. 2 and 3, however, the vehicle is on a relatively slippery road surface. As a consequence, the friction coefficient is very low so that the vehicle can only be slowed down with a low deceleration.

In a conventional brake system of the type initially referred to, the speed reference value $v_{REF}$ again decreased relatively fast after time $t_6$ indicating the beginning of the phase of instability, since the gradient of the reference speed $v_{REF}$ has been set to a fixed value which is optimal on non-skidding road surfaces, as shown in FIG. 2. The decrease in and/or slope of the reference speed $v_{REF}$ within the range between $t_6$ and $t_7$ corresponds to the slope of the reference speed according to the example given in FIG. 1.

According to the invention, however, the gradient of the reference speed $v_{REF}$ is adapted to the instantaneous friction coefficient prevailing during the control phase between $t'_6$ and $t'_7$, conf. FIG. 3. In the situation according to FIG. 3, i.e. on road surfaces with low friction coefficients, the gradient of the reference value $v_{REF}$ is, therefore, considerably flatter than in the situation according to FIG. 1. A comparison between FIGS. 2 and 3 shows that in a brake system according to the invention, the brake pressure is controlled at a lower level on road surfaces with a low friction coefficient. The renewed introduction of brake pressure after overcoming instability of the wheel begins later, the pressure variation amplitudes as well as the required control cycles and/or the control frequency are reduced. These are considerable advantages with regard to the steering stability of the vehicle and to the control comfort since a high control frequency with strong pressure variations is felt to be unpleasant.

On road surfaces with a high friction coefficient, conf. FIG. 1, there are no important differences between the conventional brake system and the brake system according to the invention.

FIG. 4 shows an embodiment of a brake system according to the invention. It depicts a deceleration-sensitively actuated brake pressure modulator 1 which is inserted into the brake circuit I and/or into the pressure fluid conduit of a conventional dual-circuit brake pressure generator 2. This brake pressure generator 2 comprises, in this case, a brake power booster 3 and a tandem master cylinder 4 with the hydraulically separate brake circuits I and II. Only the pressure fluid conduit leading from the brake pressure generator 2 by way of the modulator 1 to a wheel brake 5 is shown.

The major components of the pressure modulator 1 are a shaft 7 rotating together with the wheel 6, which shaft is coupled either directly with the vehicle wheel 6 or by way of a gear, a chain drive or the like, and carries an inert mass 8 serving as a flywheel. The shaft 7 and the inert mass 8 are, by way of a clutch and brake mechanism, engaged such that "normally", i.e. when the control system is out of operation, the mass 8 rotates together with the shaft 7. If the deceleration of the wheel 6 and thus of the shaft 7 exceeds a threshold value, the mass 8 retains its speed, for the time being, due to the rotational energy accumulated in it. In this case, an axial displacement of the inert mass 8 on the shaft 7 in the direction of arrow 11 is caused by means of an arrangement comprising a ball 10 and a circular inclined ramp 9. Said inclined ramp 9, wherein the ball 10 is running, is fit in a disc 12 which is firmly connected with the shaft 7 and/or in the inert mass 8, for instance, by means of a milling process. During the axial displacement, an intermediate member 13 is brought into engagement with the flywheel 8 by way of friction linings 14.

The axial displacement is transmitted onto the piston 17' of a slide valve 17 through the intermediary of an actuating lever 16 articulated at the housing 15 of the modulator 1, and leads to a displacement of said piston in the direction of arrow 18 through the effect of a spring 19. In the depicted inoperative position, the lever 16 is held by means of a relatively weak spring 21.

A return force produced by means of a return spring 22 and a pressure acting on the support of said spring acts in opposite direction to the axial displacement of the flywheel 8. In the shown embodiment, a sleeve and/or a piston 23 which is axially displaceably arranged on the shaft 7 is provided as a support. In the depicted inoperative position, the piston 23 abuts on a circumferential edge which has been formed by means of a contraction of the bore 24 inside the modulator housing 15, which bore serves to guide the piston 23. The piston 23 is sealedly guided both relative to the shaft 7 and to the bore 24 through the intermediary of o-rings.

A face of the piston 23 confines an annular chamber 25 inserted into the pressure fluid conduit leading from the brake pressure generator 2 by way of the bores 26, 27 and 28 in the housing 15 of the modulator 1 and by way of a pressure fluid conduit 29 to the wheel brake 7. In the inoperative position, the hydraulic passage by way of the bore 26 to the bore 27 is switched so as to be open through the intermediary of an annular chamber 36 of the piston 17'.

In the embodiment according to FIG. 4, the return spring 22 abuts, on its side directed towards the inert mass, on an intermediate member 13 rotating together with the shaft 7—irrespective of the amount of the wheel deceleration or acceleration—and being axially displaceable on said shaft. The intermediate member 13 can, for instance, be supported by webs or teeth (not shown) which are mounted on the shaft 7 parallel to the axis and which mesh with respective notches of the intermediate member 13 (also now shown).

In the illustrated inoperative position of the brake pressure modulator 1, the friction pairing, that is, linings 14 on the intermediate member 13, on the one hand, and on the flywheel 8, on the other hand, are either separated from each other by means of a small gap or are brought into contact with each other by means of only a low pressure of the spring 22 which is unloaded in the inoperative position. An air gap could, for instance, be achieved by means of a stop arranged on the shaft 7, which stop would confine the movement of the intermediate member to the right (as shown in FIG. 4) and would only permit the friction linings to abut on each other in the event of an axial displacement of the rotating mass 8 in the direction of arrow 11 due to a wheel deceleration.

In addition, a supporting disc 20 is inserted between the actuating lever 16 and the intermediate member 13, which supporting disc is also displaceable parallel to the axis and through the intermediary of which supporting disc the movement of the inert mass 8 parallel to the axis can be transmitted onto the level 16, on the one hand, and the return force of the spring 21 can be transmitted onto the intermediate member 13, on the other hand. In the embodiment according to FIG. 4, the spring 21 is also pre-loaded by means of the piston 23, however, said spring could as well abut on the shaft 7.

Finally, a connection bore 30 and a bore 31, connected to which is a pressure fluid and compensating reservoir 32, are also provided in the housing 15 of the modulator 1, said bores being inerconnected by way of a conduit which is closed in the inoperative position. The wheel 6 to which the brake 5 is mounted is illustrated symbolically by means of a brake disc 33, a wheel rim 34 and a tire 35. The brake system according to the invention as illustrated in FIG. 4 operates as follows:

The brake pressure modulator 1 has no effect on normal, i.e. uncontrolled, braking operations. The brake circuit I is directly connected with the wheel brake 5 by way of the bores 26 and 27, the annular chamber 25 and the bore 28 as well as by way of the conduit 29.

Since the annular chamber 25 is inserted into the fluid pressure circuit I, the brake pressure also acts onto the adjacent face of the piston 23. The brake pressure is, by way of piston 23 and by way of the return spring 22, also transmitted to the flywheel 8 in the return direction, i.e. opposite to the direction of axial displacement characterized by the arrow 11. In addition, the brake pressure acts, by way of the return spring 21, onto the actuating lever 16 and by way of the latter onto the intermediate member 13.

As long as the wheel runs in a stable manner, the shaft 7 and the inert mass and/or the flywheel 8 are rotating at the same speed. The brake pressure modulator 1 assumes its rest position. The individual components assume the depicted positions, except for the piston 23 which is axially displaced on the shaft 7 in the direction of the inert mass 8 as a function of the brake pressure in the brake circuit I. Thereby, the pre-load of the springs 22 and 21 is changed.

If a critical wheel deceleration occurs, the flywheel 8 at first retains its speed due to the rotational energy accumulated in it, so that a difference in speed is being generated between the flywheel 8 and the shaft 7. The guiding of the ball 10 on the inclined ramp 9 causes an axial displacement of the inert mass 8 in the direction of arrow 11, namely, in opposition to the force of the return springs 22 and 21 and in opposition to the brake pressure in the annular chamber 25, which brake pressure boosts the return force of the springs 21, 22 by way of the piston 23. In addition, the axial displacement of the flywheel 8 results in an engagement of the friction linings 14, the inert mass 8 thus being, in this phase, decelerated in dependence upon the brake pressure in the annular chamber 25 and the return force of the springs 22, 21, which deceleration will only be terminated when the shaft 7 and the inert mass 8 are again running at synchronous speeds, or when the friction pairing, i.e. the linings 14 on the intermediate member 13 and on the flywheel 8, are separated from each other.

At a high brake pressure in the chamber 25 and thus in the wheel brake 5, the deceleration of the flywheel 8 is, therefore, considerably higher during the control phase than at a low brake pressure. During the phase of instability, the deceleration of the flywheel 8 is thus at least approximately proportional to the amount of the brake pressure in the wheel brake 5.

The axial displacement of the inert mass 8 in the direction of arrow 11 causes, in addition, a rotation of the actuating lever 16 in its fulcrum 16'. Thereby, the piston 17' of the brake pressure control valve 17 is moved in the direction of arrow 18 which entails, at first, an interruption of the pressure fluid conduit from the master cylinder 4 by way of the bore 26 and by way of the annular chamber 36 to the bore 27. During this phase, the brake pressure remains almost constant. When the piston movement of the valve 17 in the direction of arrow 18 is continued, the connection bore 30 inside the modulator housing 15 is connected by way of the chamber at the face of the piston 17', which chamber houses the spring 19, with the bore 31, and the pressure fluid can thus be discharged to the pressure fluid and compensating reservoir 32. The pressure in the annular chamber 25 and thus in the brake 5 is reduced in this manner.

Since the return force generated and transmitted by the springs 21, 22 and thus the axial displacement of the inert mass 8 in the direction of arrow 11 is dependent on the brake pressure in the wheel brake 5, the rotation of the lever 16 and thus the response and the displacement of the brake pressure control valve 17 is variable and/or dependent on the instantaneous brake pressure. Thereby, the rotational movement of the rotating mass 8, the deceleration of this disc during the phase of instability, and the wheel deceleration threshold value are varied as a function of the road conditions and/or the friction coefficient during the controlled braking operation.

The described control action was caused by means of a wheel 6 becoming instable, i.e. by an imminent wheel lock tendency. The brake pressure which has been reduced as a result thereof, now permits a re-acceleration of the vehicle wheel 6, the rotating inert mass 8 and the shaft 7 thus re-assuming the same rotational speed. The flywheel 8 is returned to the depicted position relative to the shaft 7. This leads, by way of the lever 16 and the piston 17', to a termination of the pressure reduction in the brake pressure control valve 17 and finally to a renewed opening of the pressure fluid conduits connecting the brake pressure generator 2 with the wheel brake 5. Thereby, the brake pressure in the wheel brake 5 is again increased up to the level of the pressure in the master cylinder 4 of the brake pressure generator 2.

From the reservoir 32, pressure fluid is lead back into the brake circuit I by way of a pump system not depicted in the drawing.

What is claimed is:

1. Slip-controlled brake system with a deceleration-sensitively actuated brake pressure modulator comprising a shaft rotating at a velocity related to the angular velocity of a controlled vehicle wheel and an inert mass arranged on the shaft and rotating together with said shaft, which inert mass is axially displaceable in opposition to a return force on said shaft when the controlled vehicle wheel is decelerated and a wheel deceleration threshold is exceeded and which thereby acts upon a control element controlling the brake pressure modulation, said return force being provided by a resilient means comprising at least two return springs and mounted adjacent to a pressure chamber coaxially surrounding said shaft and communicating with the brake pressure in the wheel brake (5) of the controlled wheel (6), said brake system further including a clutch and brake mechanism which permits a difference in speed between the shaft and the inert mass (8) when the vehicle wheel is decelerated, and which causes the axial displacement as well as a deceleration of the inert mass (8) during the control phase, wherein said resilient means are operable to vary the deceleration of the inert mass (8) as a function of the instantaneous brake pressure in the wheel brake (5) of the controlled wheel (6).

2. Brake system according to claim 1, wherein the modulator is constructed such that the deceleration of the rotating inert mass (8) is sets in after the mass has been displaced from an inoperative position.

3. Brake system according to claim 2, wherein the force required to decelerate the rotating inert mass (8) is at least approximately proportional to the return force acting in the opposite direction to the axial displacement.

4. Brake system according to claim 3, wherein said at least two return springs (21, 22) abut on a member on a side of said member which faces opposite to the inert mass (8), which member is axially displaceably arranged on the shaft (7), and which is pressurizable in the return direction of the axial displacement of the inert mass (8) by means of the pressure prevailing within the wheel brake (5) of the controlled vehicle wheel (6).

5. Brake system according to claim 4, wherein an arrangement (9, 10) is provided between a disc (12), mounted on the shaft (7), and the inert mass (8), said arrangement comprising, substantially, a ball (10) and an annular inclined ramp (9) and said arrangement causing the axial displacement of the inert mass (8) in the event of a difference in speed between the shaft (7) and the inert mass.

6. Brake system according to claim 5, wherein friction linings (14) are inserted between an intermediate disc (13), rotating together with the shaft (7) and being displaceable parallel to the axis of said shaft, and between the inert mass (8) in order to decelerate said inert mass (8).

7. Brake system according to claim 6, wherein, a brake pressure control valve (17) is, in the event of an axial displacement of the inert mass (8), actuable by way of a lever (16) of the control element, which lever is actuated by means of the inert mass (8), the wheel deceleration threshold then being adapted to vary as a function of the return force.

* * * * *